No. 869,522. PATENTED OCT. 29, 1907.
G. D. SCHEIFFLER.
MACHINE FOR MIXING CONCRETE.
APPLICATION FILED SEPT. 20, 1906.
5 SHEETS—SHEET 2.
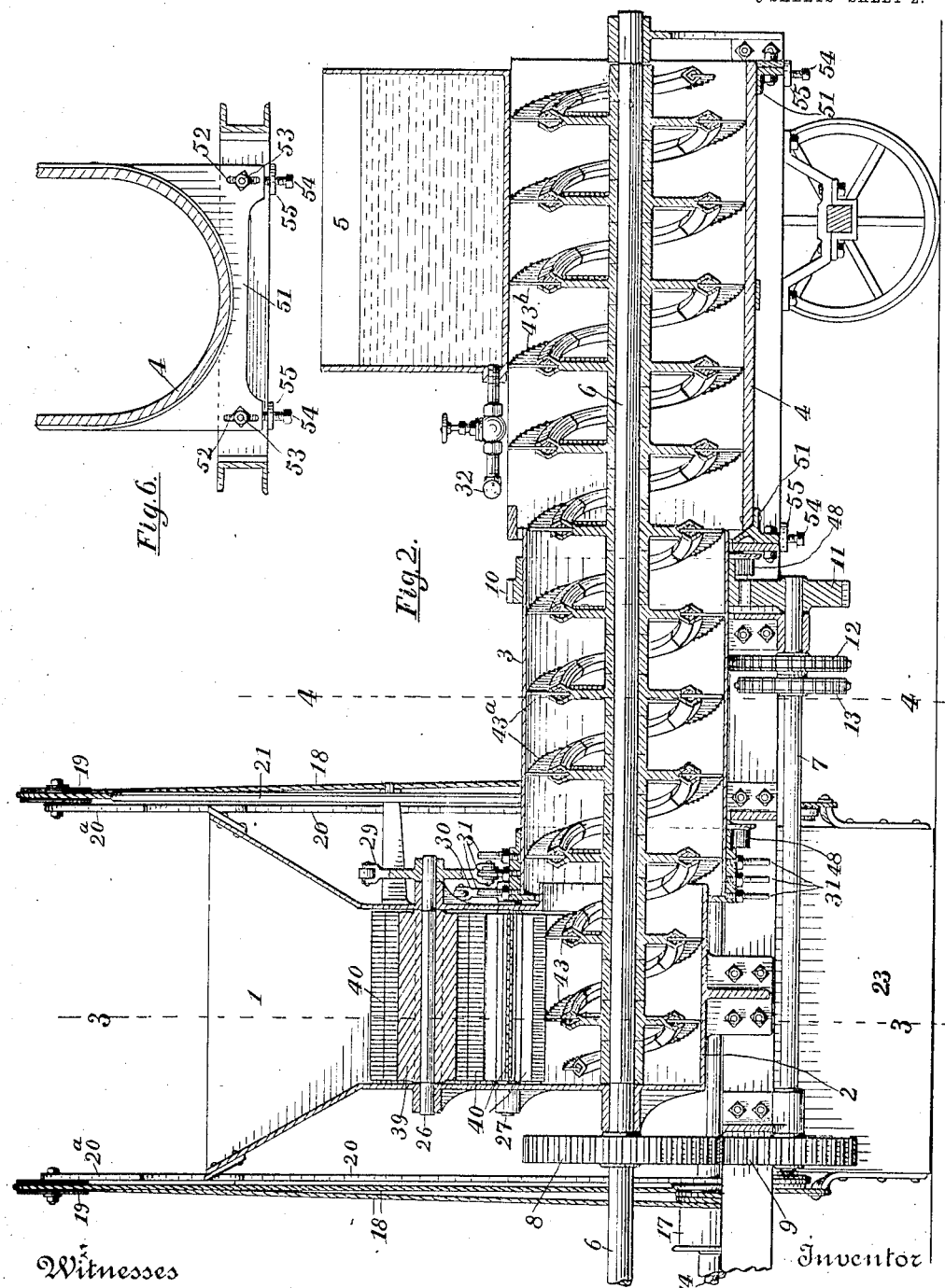
Witnesses
Palmer A. Jones
Georgiana Chace
Inventor
George D. Scheiffler
By Luther V. Moulton
Attorney No. 869,522.
PATENTED OCT. 29, 1907.
G. D. SCHEIFFLER.
MACHINE FOR MIXING CONCRETE.
APPLICATION FILED SEPT. 20, 1906.
5 SHEETS—SHEET 3.
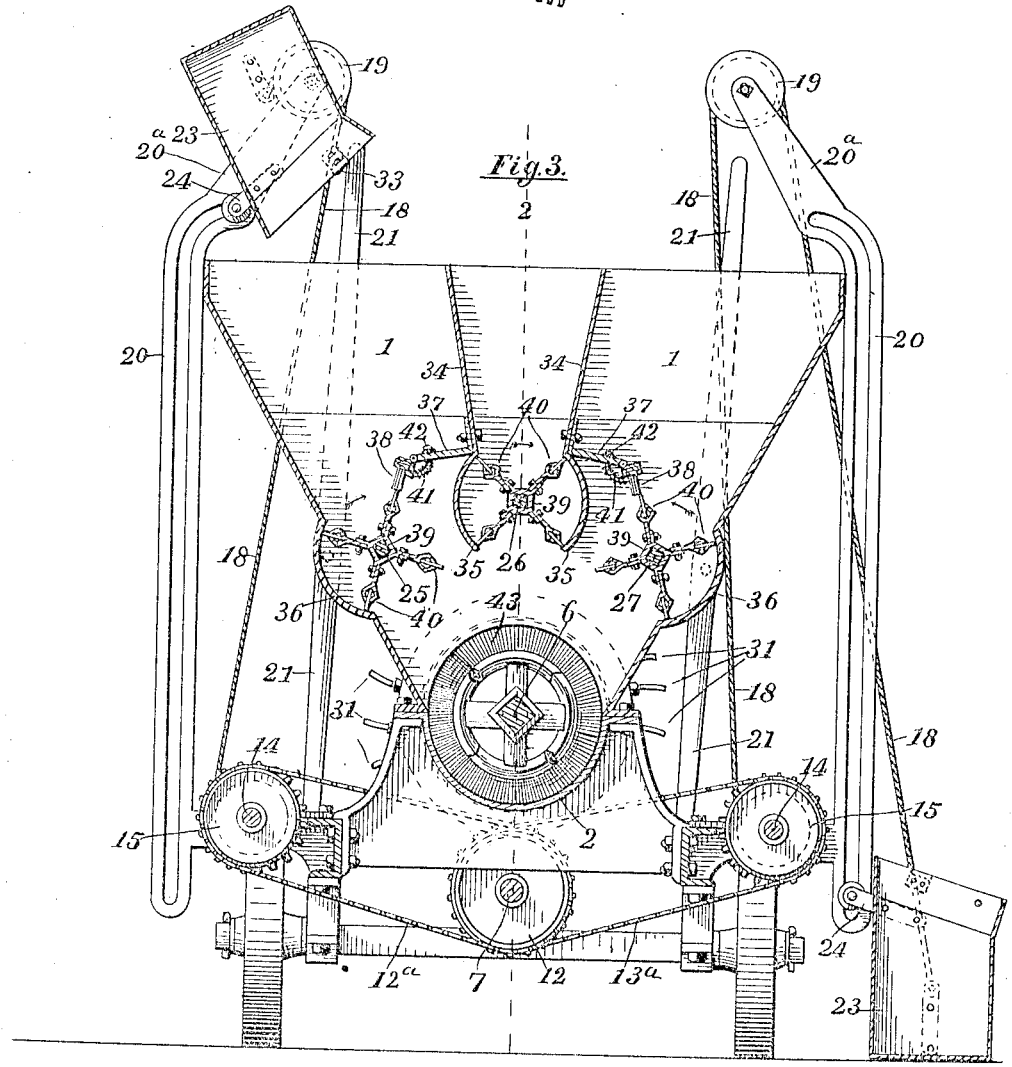

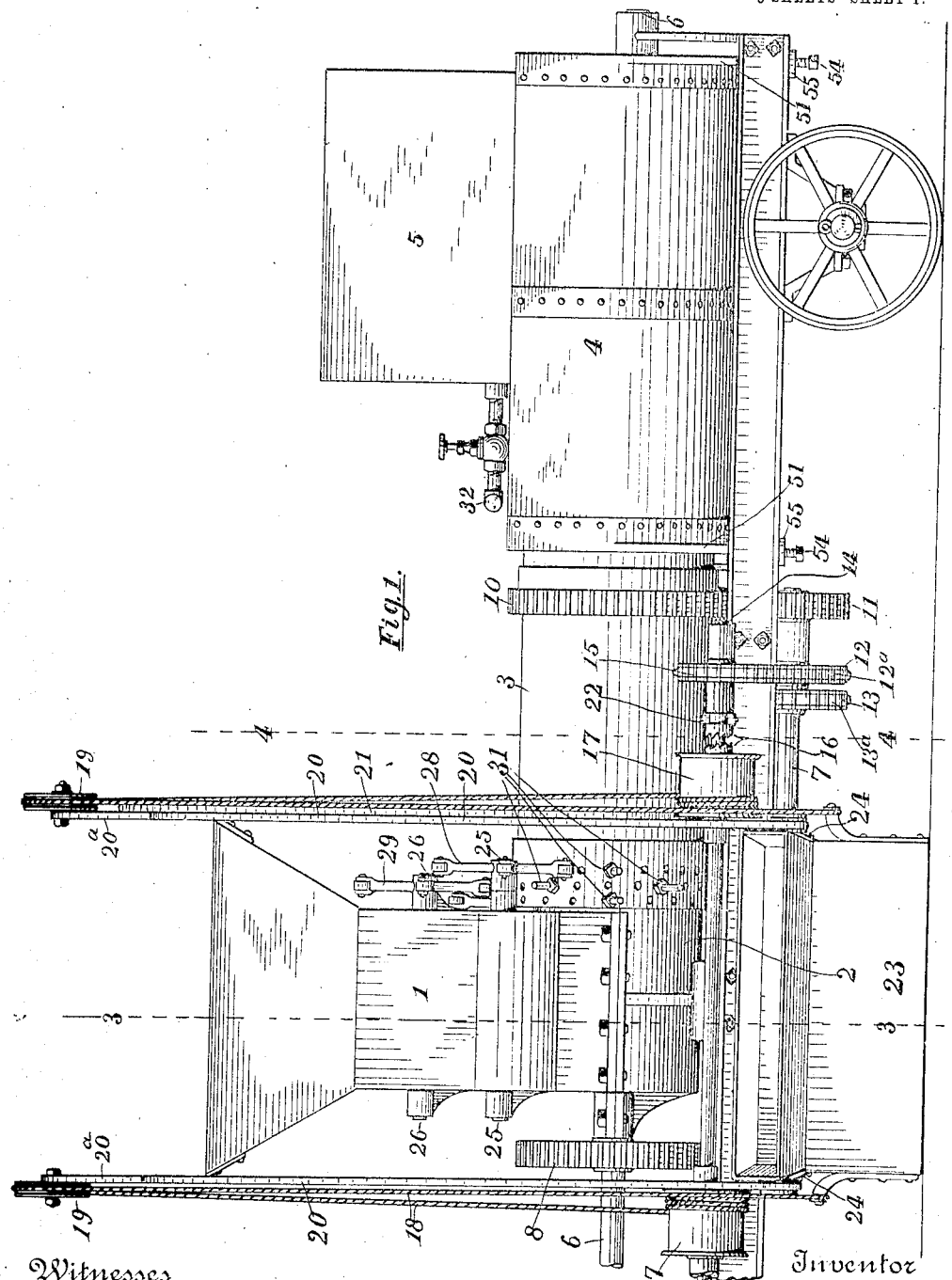

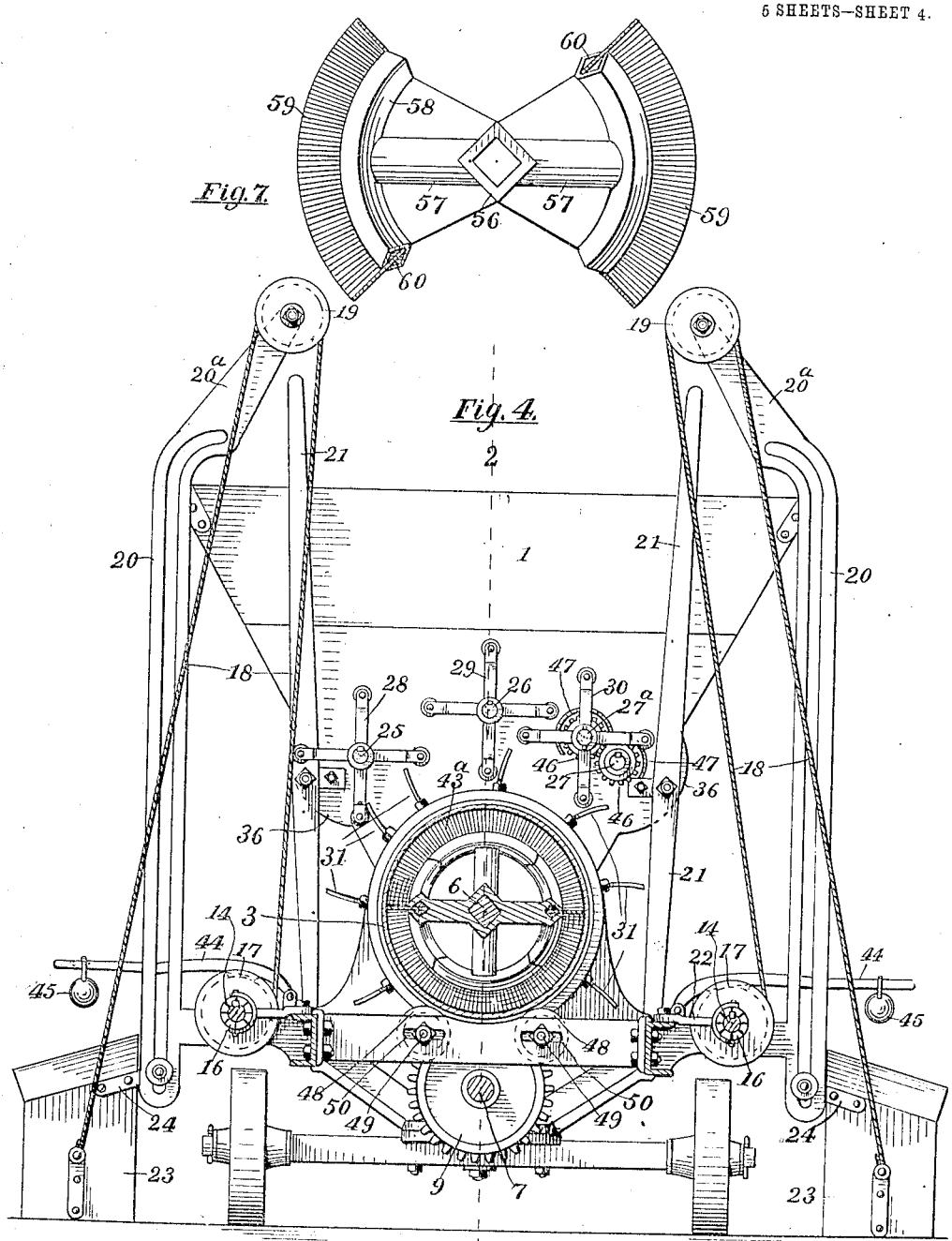

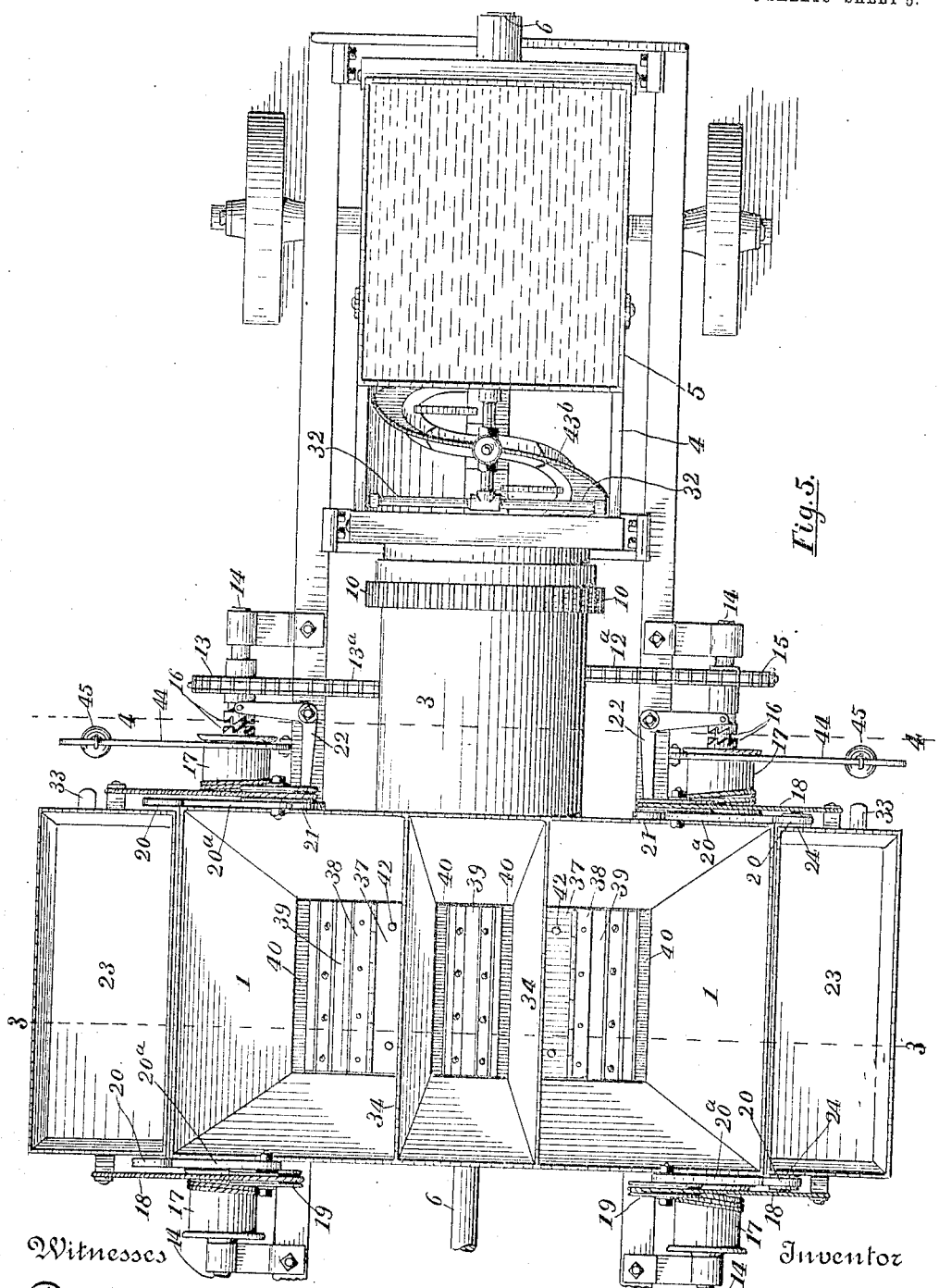

UNITED STATES PATENT OFFICE.

GEORGE D. SCHEIFFLER, OF JACKSON, MICHIGAN.

MACHINE FOR MIXING CONCRETE.

No. 869,522.　　　Specification of Letters Patent.　　　Patented Oct. 29, 1907.

Application filed September 20, 1906. Serial No. 335,426.

*To all whom it may concern:*

Be it known that I, GEORGE D. SCHEIFFLER, a citizen of the United States of America, residing at Jackson, in the county of Jackson and State of Michigan, have invented certain new and useful Improvements in Machines for Mixing Concrete; and I do hereby declare the following to be a full, clear, and exact description of the invention, such as will enable others skilled in the art to which it appertains to make and use the same.

My invention relates to improvements in machines for mixing concrete, and its object is to provide the device with various new and useful features hereinafter more fully described and particularly pointed out in the claims, reference being had to the accompanying drawings, in which:

Figure 1. is a side elevation of a machine embodying my invention; Fig. 2. a longitudinal vertical section of the same on the line 2—2 of Figs. 3 and 4; Fig. 3. a transverse vertical section on the line 3—3 of Figs. 1, 2 and 5; Fig. 4. the same on the line 4—4 of Figs 1, 2 and 5; Fig. 5. a plan view of the same; Fig. 6 a sectional detail showing means for adjusting the case 4; Fig. 7. an enlarged detail of one of the spiral conveyer brushes; and, Fig. 8 the same of one of the hopper brushes.

Like numbers refer to like parts in all of the figures.

1 represents the hopper to the feed mechanism; 2 the concave bottom of the same to receive the various ingredients from the feed mechanism; 3 a rotating cylinder constituting the case of the dry mixer; 4 the stationary case of the wet mixer, the same being semi-cylindrical below the axis and having vertical sides above the axis and open at the top; 5 is a water tank to supply water to the wet mixer through a sprinkler 32 attached thereto and arranged above the receiving end of the wet mixer; 6 represents the main shaft rotated by any convenient means preferably by a gasolene engine (not shown) mounted on the forward end of the frame which is broken away and not shown.

7 is a countershaft rotated by gears 8 and 9 connecting it with the shaft 6. To rotate the cylinder 3 it is provided with a gear 10 surrounding said cylinder and engaged by a pinion 11 on the shaft 7.

12 and 13 are sprocket wheels on the shaft 7, which wheels 15 are connected by chains 12ª and 13ª to like wheels rotative and slidable on shafts 14 at the respective sides of the machine. On each of said shafts 14 are also mounted two winding drums 17 spaced apart at each side of the hopper 1 and each drum nearest the wheel 15 is detachably connected thereto by a clutch 16 engaged and disengaged by sliding the wheel on the shaft by means of a bell crank lever 22, connected to the hub of the wheel by the usual forked end, and moved by a lever 21 pivoted to the hopper and extending to near the top of the same.

Buckets 23 are provided at each side of the machine for hoisting the material and dumping the same into the hopper. These buckets are provided with arms 24 at their opposite sides which engage and traverse slotted guides 20 curved inward at the top and terminating above the hopper. Arms 20ª extend upward and inward from the guides on the upper ends of which arms are journaled pulleys 19 engaged by hoisting cables 18 attached to the buckets at one end and wound on the drum 17 at the other end.

On each bucket is a lug 33 to engage and move the lever 21 inward and disengage the clutch 16 when the bucket has been turned to dumping position by engagement of the guide arms 24 with the upper ends of the slots in the guides 20. To prevent too rapid fall of the buckets after the clutches are released, I provide a brake lever 44 to frictionally engage a drum 17 on each shaft and an adjustable weight 45 to operate the lever. The weight may be dispensed with however, and the brake manually operated if preferred.

The hopper is divided into three parts by partitions 34 which extend from the top of the hopper downward about half-way to the bottom thereof. These partitions are spaced apart at each side of the middle of the hopper and converge downward terminating in two opposing concaves 35 concentric with the axis of a shaft 26 journaled in the hopper. These concaves extend through arcs of about 90 degrees, thus leaving top and bottom openings therebetween of about the same extent. On this shaft is a spider 39 having four equi-distant radial wings to each of which is secured a brush 40 projecting radially and traversing at its outer and flexible end close to the concaves. These brushes are made preferably of flat strips of steel stiff enough to support and move the cement, which is placed in the hopper between these partitions 34, and at the same time sufficiently yielding to permit any small solid substances such as nails or small stones to pass without breaking or stalling the device. In the opposite walls of the hopper are also formed concaves 36 of substantially 90 degrees and in the axis of each concave is journaled the respective shafts 25 and 27, on each of which is mounted a spider 39 and brushes 40 as described on the shaft 26. Substantially opposite the upper edges of the concaves 36 and close to the path of the outer ends of the brushes on the shafts 25 and 27 are brushes 38, arranged radially to the shafts, and each pivotally attached to the lower edge of an inclined shelf 37 adjustably attached to the partition 34. These brushes are yieldingly held in place by springs 41 engaging the brush at one end and the shelf 37 at the other end. Within each spring is a rod 42 curved concentric with the pivot of the brush, being attached to the brush at one end and movable in an opening in the shelf at the other end. A head on this rod engages the shelf and limits the movement of the brush under pressure of the spring. These brushes are all preferably of flexible steel strips arranged close together, the shelf brushes preferably being made as shown in Fig. 8 by providing a cast metal head 62 having a dovetail channel therethrough, in which is inserted a block of wood 61, in which block are inserted the steel strips 38 of double length and each folded to enter two openings in the block.

In the side compartments of the hopper, the sand and broken stone or gravel is respectively placed by means of the described hoisting device, and the brushes are of sufficient stiffness to hold and move the same and at the same time yield to pass any stones or other obstructions that may be therein without stalling or breaking the machine. Below the feeding devices described, the hopper opens into the semi-cylindrical bottom 2, in the axis of which is the shaft 6 provided with spiral brushes 43 arranged to sweep close to the bottom and move the material along the same and out through the open end thereof, which end is tubular and extends within the receiving end of the rotating cylinder 3, which latter is of greater diameter than the end of the hopper inserted therein.

The spiral brushes on the shaft are of increased radius in this cylinder as at 43ª and contact the bottom thereof sufficient to sweep the material along the same and also to prevent adhesion thereof to the cylinder. The discharge end of this cylinder rotates within the receiving end of the case 4, which latter is of greater diameter than the cylinder 3 and the brushes on the shaft are further enlarged radially to contact and sweep the bottoms of this case at 43ᵇ.

The cylinder 3 is supported on flanged rolls 48 journaled on studs 49 horizontally adjustable in slots 50 in the frame, whereby the cylinder may be vertically adjusted, to compensate for the wear of the brushes by moving the studs toward each other, and the case 4 is mounted on saddles 51 provided with vertical slots 52 and adjustably secured to the frame by bolts 53 in the slots, screws 54 in lugs 55 on the frame, serve to engage and vertically adjust the saddles.

The shaft 6 is preferably square and the spiral brushes on the same are preferably made as illustrated in Fig. 7, with a square hub 56 having a square opening to fit the shaft and when arranged in series thereon, these hubs will abut end to end. Opposing radial arms 57 extend from each hub and support hollow segments 58 arranged concentric with the axis of the hub and as shown are substantially 90 degrees in length but may be shorter leaving spaces therebetween, and will operate as well when thus made. These segments have peripheral slots to receive the brushes 59, which brushes are preferably of flexible strips of steel and arranged close together and extending radially, and may be of a single layer as shown, or two or more overlapping layers, as preferred. These brushes at their inner ends engage an angle or groove of the interior of the segments and are secured in place by casting soft metal around the same and filling the interior of the segments therewith. The brushes mounted on the spiders of the feeding mechanism are also made with hollow members having flexible steel brushes inserted therein and secured the same as described for the spiral brushes, but are straight instead of spiral.

Each of the shafts 25, 26 and 27 is intermittently rotated one-fourth of a revolution, and in the direction of the arrows, and the frequency of the movement of each is determined as follows: On the shaft 25 is fixed four equal and equi-distant radial arms 28 having rolls journaled in their outer ends. The shaft 26 is also provided with the same as at 29. The same is also provided for the shaft 27 as at 30, but to reverse the direction of rotation of this shaft, these arms are journaled on a stud 27ª and connected to the shaft 27 by equal spur gears 46, which gears are protected by a casing 47 to keep sand and gravel therefrom. The arms for each shaft rotate in separate planes and equi-distant from the axis of the rotating cylinder 3, in which cylinder are inserted radial pins 31 in the respective planes of the respective sets of arms, whereby each several series of pins will successively engage the respective arms and no others. By inserting a greater or less number of pins in the respective series of openings for the same, the frequency of movement of the respective feeding mechanisms will be determined and thus the proportions of the respective ingredients determined. These pins are curved backward which prevents them from turning out of their screw-threaded sockets and also adapts them to engage the rolls, the same as gear teeth would engage the same. To further secure the pins in place, they are provided with jam nuts, not numbered.

In operation the material is placed in the buckets and hoisted, being automatically dumped into the respective side compartments of the hopper. The sacks of cement are manually emptied into the middle compartments. The feed of the different ingredients is determined by the number of pins in the respective series around the cylinder, each feeder being turned intermittently one-fourth of a revolution by each pin in its respective row and stops in the position shown in the drawing. The cylinder 3 and spiral brush therein turn at different rates of speed whereby the material in the dry state is very thoroughly mixed before entering the wet mixer and the brush engages the inner surface of the cylinder and removes the adhering material therefrom. It therein receives the proper quantity of water from the sprinkler 32 and is again thoroughly stirred by the brushes in the case 4, whereby the water is evenly incorporated therewith, being finally discharged at the open rear end of the case 4. The brushes being flexible and contacting the cylinder and case, clear the same from adhering material, thoroughly mix the same and convey it axially along the hopper bottom, the cylinder 3 and the case 4 and finally discharge it from the open end of the latter.

I do not herein claim the specific feed regulator, hoisting apparatus, or brushes described, but reserve the same for separate applications in accordance with the requirement of the office for division of this application.

What I claim is:

1. In a concrete mixer, the combination of a case having an imperforate concave bottom, an imperforate rotative cylinder communicating end to end with the case, a rotative brush in the case and cylinder and contacting the inner surfaces of each of the same, and means for rotating the brush and the cylinder at different relative speeds.

2. In a concrete mixer, the combination of a rotative cylinder, a stationary case in communication with the cylinder, a rotative brush in the cylinder and case and engaging the inner surface of the same, means for rotating the brush and cylinder at different relative speeds, means for supplying dry material to the cylinder, and means for supplying water to the case.

3. In a concrete mixer, the combination of a hopper having a concave bottom, a rotative cylinder communicating with the hopper at one end, a stationary case communicating with the cylinder and having a concave bottom, a shaft extending through the axis of the hopper, the axis of the cylinder and the axis of the case, and a spiral member on the shaft, said member having a flexible periphery engaging the bottom of the hopper, the interior of the cylinder, and the bottom of the case, and means for rotating the shaft and cylinder.

4. In a concrete mixer, the combination of a stationary case having a concave bottom, a rotative cylinder having one end inserted in one end of the case, a hopper having a concave bottom, and also having a discharge extension inserted in one end of the rotative cylinder, a shaft in the axis of the hopper, the axis of the cylinder and the axis of the case, a spiral brush on the shaft and engaging the inner surfaces of the hopper, the cylinder and the case, feed regulating mechanism in the hopper, means for supplying water to the case, and means for rotating the cylinder and the shaft at different relative speeds.

5. In a concrete mixer, the combination of a hopper having a concave bottom and a tubular discharge extension, a rotative cylinder having one end surrounding said extension, a case having one end surrounding the other end of said cylinder, means for vertically adjusting the cylinder and the axis of the case, a spiral member on the shaft and having a flexible periphery engaging the bottom of the hopper the interior of the cylinder and the bottom of the case, and means for rotating the shaft and cylinder at different relative speeds.

6. In a concrete mixer, the combination of a hopper, a feed regulator in the hopper, radial arms on the feed regulator shaft and outside of the hopper, a rotative mixing cylinder communicating with the hopper, and a series of detachable pins in the cylinder to engage the arms and operate the feed regulator said pins being variable in number to change the rate of operation of the feed regulator.

7. In a concrete mixer, the combination of a hopper divided into separate compartments, a feed regulator in each of the compartments, a series of radial arms on each regulator shaft and outside of the hopper, each series of arms rotating in a different plane, a rotative mixing cylinder communicating with the hopper, and a separate series of pins in the cylinder for each feed regulator and engaging the radial arms thereof.

8. In a concrete mixer, the combination of a main shaft having a spiral brush thereon, a hopper having a concave bottom beneath the brush, a rotative cylinder, a gear surrounding the cylinder, a counter-shaft geared to the main shaft and driven thereby, a pinion on the counter-shaft and engaging the gear on the cylinder, rolls supporting the cylinder, a feed regulator in the hopper and having radial arms, and a series of pins in the cylinder to engage the arms and operate the feed regulator.

9. In a concrete mixer, a hopper having a concave bottom, a feed regulator in the hopper, a rotative mixing cylinder communicating with the hopper, radial arms on the feed regulator shaft and outside of the hopper, detachable and rearwardly curved pins in the cylinder and engaging the arms to operate the feeder, and means for rotating the cylinder.

10. In a concrete mixer, the combination of a rotative mixing cylinder, a hopper communicating with the cylinder, a feed regulator in the hopper and having radial arms outside the hopper, pins in the cylinder to engage the arms and operate the feeder, a rotative mixer in the cylinder, and a countershaft geared to the rotative mixer, and also geared to the cylinder to rotate each at different relative speeds.

11. In a concrete mixer, the combination of a hopper having upper compartments and a concave bottom, a rotative cylinder, a stationary case, the hopper bottom the cylinder and the case being arranged in axial alinement and communicating in series, a shaft in the axis of the same, a spiral brush on said shaft, a feed regulator in each compartment of the hopper, means for supplying water to the case, a counter-shaft geared to the brush shaft, gears connecting the counter-shaft and the cylinder, and means for operating the feed regulators.

In testimony whereof I affix my signature in presence of two witnesses.

GEORGE D. SCHEIFFLER.

Witnesses:
 LUTHER V. MOULTON,
 GEORGIANA CHACE.